United States Patent
Savell et al.

(10) Patent No.: US 7,107,401 B1
(45) Date of Patent: Sep. 12, 2006

(54) METHOD AND CIRCUIT TO COMBINE CACHE AND DELAY LINE MEMORY

(75) Inventors: Thomas C. Savell, Santa Cruz, CA (US); Boon Choong Chuan, Scotts Valley, CA (US)

(73) Assignee: Creative Technology Ltd, Singapore (SG)

( * ) Notice: Subject to any disclaimer, the term of this patent is extended or adjusted under 35 U.S.C. 154(b) by 353 days.

(21) Appl. No.: 10/741,227

(22) Filed: Dec. 19, 2003

(51) Int. Cl.
*G06F 12/00* (2006.01)

(52) U.S. Cl. .................... 711/118; 711/119; 711/122; 711/137; 712/35; 365/76; 365/194

(58) Field of Classification Search .................... None
See application file for complete search history.

(56) References Cited

U.S. PATENT DOCUMENTS

| | | | |
|---|---|---|---|
| 3,959,594 A | 5/1976 | Srivastava | |
| 4,231,277 A | 11/1980 | Wachi | |
| 4,282,790 A | 8/1981 | Wachi et al. | |
| 4,377,960 A | 3/1983 | Okumura | |
| 4,432,265 A | 2/1984 | Oya et al. | |
| 4,472,993 A | 9/1984 | Futamase et al. | |
| 4,643,067 A | 2/1987 | Deutsch | |
| 4,715,257 A | 12/1987 | Hoshiai | |
| 4,757,469 A | 7/1988 | Odijk | |
| 4,855,827 A | 8/1989 | Best | |
| 5,073,942 A | 12/1991 | Yoshida | |
| 5,111,727 A | 5/1992 | Rossum | |
| 5,170,369 A | 12/1992 | Rossum | |
| 5,248,845 A | 9/1993 | Massie et al. | |
| 5,303,309 A | 4/1994 | Rossum | |
| 5,342,990 A | 8/1994 | Rossum | |
| 5,376,752 A | 12/1994 | Limberis | |
| 5,394,152 A | 2/1995 | Pieronek | |
| 5,625,890 A | 4/1997 | Swift | |
| 5,657,476 A | 8/1997 | O'Connell | |
| 5,698,803 A | 12/1997 | Rossum | |
| 5,698,807 A | 12/1997 | Massie et al. | |
| 5,710,978 A | 1/1998 | Swift | |
| 5,740,716 A | 4/1998 | Stilson | |
| 5,763,800 A | 6/1998 | Rossum | |
| 5,781,461 A | 7/1998 | Jaffe et al. | |
| 5,864,876 A | 1/1999 | Rossum et al. | |
| 5,918,302 A | 6/1999 | Rinn | |
| 5,928,342 A | 7/1999 | Rossum et al. | |
| 6,032,235 A | 2/2000 | Hoge | |
| 6,275,899 B1 * | 8/2001 | Savell et al. | 711/118 |
| 6,363,104 B1 * | 3/2002 | Bottomley | 375/148 |
| 6,917,739 B1 * | 7/2005 | Chen | 385/122 |
| 6,967,893 B1 * | 11/2005 | Heyne | 365/233 |
| 2003/0062927 A1 * | 4/2003 | Vaidyanathan et al. | 327/1 |

* cited by examiner

*Primary Examiner*—Mano Padmanabhan
*Assistant Examiner*—Jasmine Song
(74) *Attorney, Agent, or Firm*—Schwegman, Lundberg, Woessner & Kluth, P.A.

(57) ABSTRACT

A method and a digital processor circuit to process digital delays are provided. The digital processor circuit may comprise circuit memory and a processor module such as a digital signal processor (DSP), a delay line module, a filter module and a sample rate converter module. The circuit memory may comprise a digital delay line memory portion to provide a plurality of digital delay lines; and a cache memory portion to perform a pre-fetch data transfer operation from the main memory to the cache memory portion. The cache memory portion may comprise a plurality of delay caches that are updated with data samples from corresponding delay lines in the main memory. The sizes (e.g., the relative sizes) of the delay line memory portion and the cache memory portion of the circuit memory may be adjustable. The sizes may be dependent upon algorithms executed by the processor module.

39 Claims, 9 Drawing Sheets

METHOD AND CIRCUIT TO COMBINE CACHE AND DELAY LINE MEMORY

FIELD OF THE INVENTION

The present invention relates generally to the field of digital signal processing and, more specifically, to a method and circuit to process digital signals, for example, to implement digital delay lines.

BACKGROUND OF THE INVENTION

Delay lines are commonly used in the electronics art to provide predetermined amounts of delay for signals. The delay facilitates the implementation of many functions and features. For example, in the field of audio signal processing, digital audio delay lines are used to provide echo effects, reverberation effects, distortion effects, three-dimensional (3-D) audio, and environmental modeling.

A digital delay line is conventionally implemented with a block of memory that is accessed using two pointers, a read pointer and a write pointer. The memory block contains data samples. The read and write pointers point to the locations in the delay line containing the current read and write samples, respectively. As a data sample is written to the current location in the delay line, the write pointer is advanced to the next location. Similarly, as a data sample is retrieved from the delay line, the read pointer is advanced to the next data sample. The difference between the read and write pointers represents the signal delay, in sample periods. By adjusting the location of either the read or write pointer, or both, different amounts of delay can be obtained.

Many digital signal processing (DSP) algorithms that use digital delay lines require access to the delay lines with minimal latency (or low or near-zero access delay). Typically, a relatively large number of delay lines are needed to support these algorithms. Further, a read and a write access are typically performed for each delay line and for each sample period.

SUMMARY OF THE INVENTION

A method and apparatus for processing digital delays is provided. The invention extends to a machine-readable medium embodying a sequence of instructions that, when executed by a machine, cause the machine to carry out any one or more of the methods described herein.

The apparatus may be in the form of a digital processing circuit comprising:

circuit memory comprising:
  a digital delay line memory portion to provide a plurality of digital delay lines; and
  a cache memory portion operatively coupled to main memory, the cache memory portion comprising a plurality of delay caches that are updated during a pre-fetch operation with data samples from corresponding delay lines in the main memory; and
  a processor module coupled to the circuit memory, wherein the processor module has access to pre-fetched data samples from each delay cache in the cache memory portion and access to data samples in the delay lines of the delay line memory portion.

In one embodiment of the invention, a post-write data transfer operation transfers data samples from the cache memory portion to the main memory.

Other features of the present invention will be apparent from the accompanying drawings and from the detailed description that follows.

BRIEF DESCRIPTION OF THE DRAWINGS

The invention is illustrated by way of example, and not limitation, in the figures of the accompanying drawings, in which like references indicate similar elements unless otherwise indicated.

In the drawings.

DETAILED DESCRIPTION

A method, circuit and system for implementing digital delay lines are described. In the following description, for purposes of explanation, numerous specific details are set forth in order to provide a thorough understanding of the invention. It will be evident, however, to one skilled in the art that the invention may be practiced without these specific details.

Figure 1:
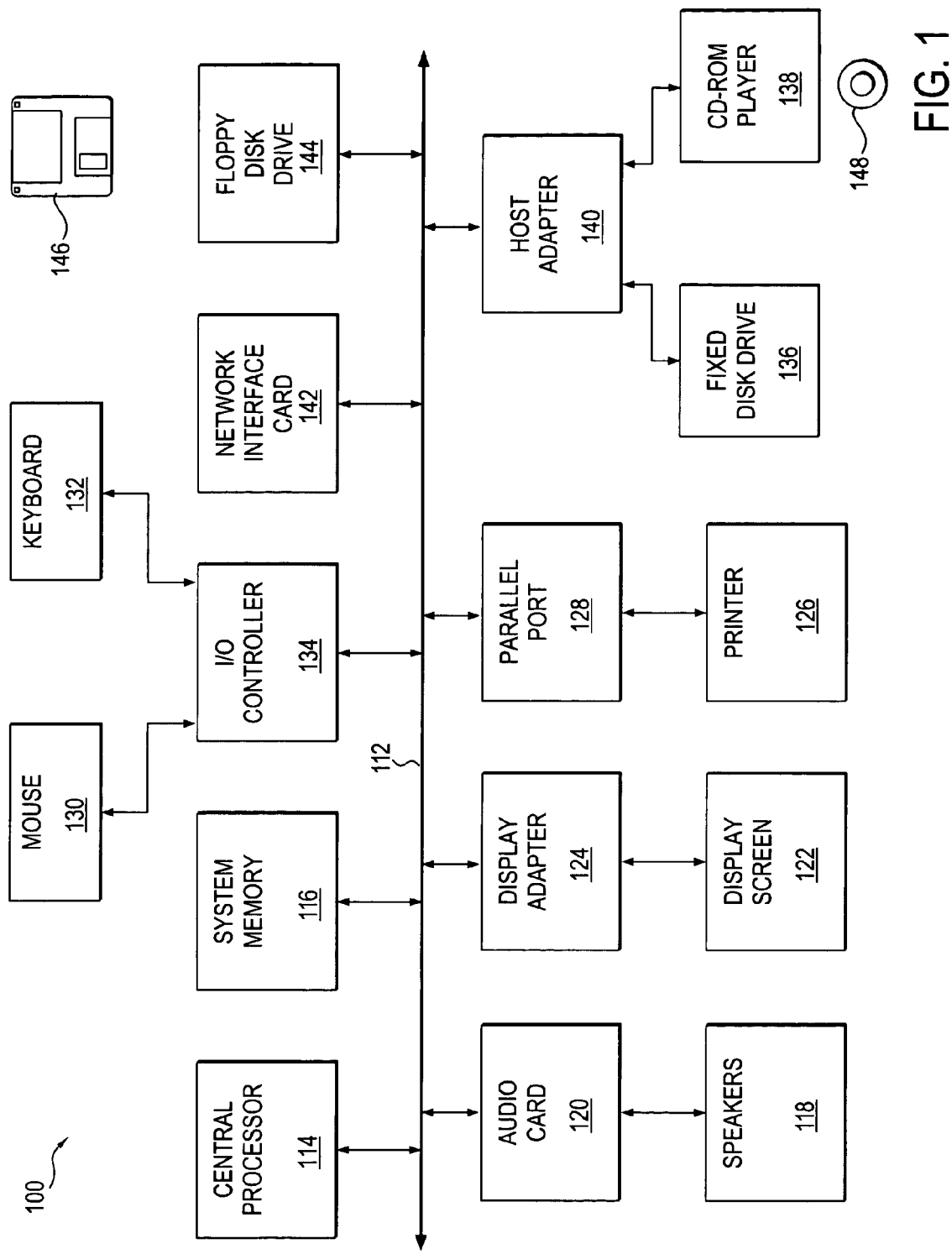
FIG. 1 shows the basic subsystems of a computer system suitable for implementing some embodiments of the invention.

Referring to the drawings, FIG. 1 shows the basic subsystems of a computer system 100 suitable for implementing some embodiments of the invention. In FIG. 1, the computer system 100 includes a bus 112 that interconnects major subsystems such as a central processor 114, a system memory 116, and external devices such as speakers 118 via an audio card 120, a display screen 122 via a display adapter 124, a printer 126 via a parallel port 128, a mouse 130 and a keyboard 132 via an input/output (I/O) controller 134, a fixed disk drive 136 and a CD-ROM player 138 via a host adapter 140, a network interface card 142, and a floppy disk drive 144 operative to receive a floppy disk 146.

It will be appreciated that many other devices or subsystems (not shown) can also be connected, such as a scanning device, a touch screen, and others. Also, it is not necessary for all of the devices shown in FIG. 1 to be present to practice the present invention. Furthermore, the devices and subsystems may be interconnected in different configurations than that shown in FIG. 1. The operation of a computer system such as that shown in FIG. 1 is readily known in the art and is not discussed in detail herein. Source code to implement some embodiments of the invention may be operatively disposed in the system memory 116, located in a subsystem that couples to the bus 112 (e.g., the audio card 120), or stored on storage media such as the fixed disk drive 136, the floppy disk 146, or a CD-ROM 148 that is operative with the CD-ROM player 138.

The bus 112 can be implemented in various manners. For example, the bus 112 can be implemented as a local bus, a serial bus, a parallel port, or an expansion bus (e.g., ADB, SCSI, ISA, EISA, MCA, NuBus, PCI, or other bus architectures). The bus 112 may provide high data transfer capability (e.g., through multiple parallel data lines) but may generally be characterized by high latency (long access time). Generally, for high efficiency, in one embodiment the bus 112 may operate in a "vectorized" or "burst" mode characterized by the grouping of many read or write transactions to memory addresses into a single memory "operation" performed on a "vector" of data. The system memory 116 can be a random-access memory (RAM), a dynamic RAM (DRAM), or other memory devices.

Figure 2:
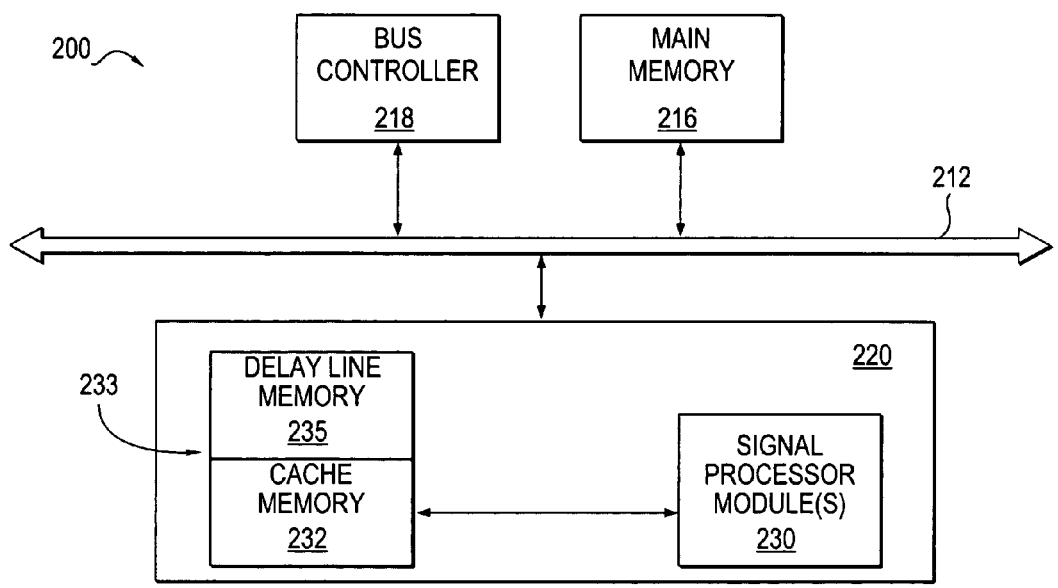
FIG. 2 shows a block diagram of an embodiment of a signal processing system in accordance with one aspect of the invention.

FIG. 2 shows a block diagram of an embodiment of a signal processing system 200 in accordance with one aspect of the invention. The signal processing system 200 can be implemented within the computer system 100 shown in FIG. 1, where a bus 212 and a main or external memory 216 correspond to the bus 112 and the system memory 116. The signal processing system 200 can also be implemented within a circuit card or board (e.g., an audio card 120 in FIG. 1), where the bus 212, the main memory 216, and a bus controller 218 are elements of the circuit card. The signal processing system 200 can further be implemented, at least in part, within an integrated circuit, such as a microprocessor, a digital signal processor (DSP), a microcomputer, an application specific integrated circuit (ASIC), or the like.

Within the signal processing system 200, the bus 212 interconnects the main memory 216, the bus controller 218, and a signal processing subsystem 220. In one embodiment, the signal processing subsystem 220 is implemented within an integrated circuit including a bus interface (e.g., a PCI interface) to interface the signal processing subsystem 220 to the bus 212. The signal processing subsystem 220 may include one or more signal processor module(s) 230 coupled to subsystem or circuit memory 233. In one embodiment, the circuit memory 233 is local on-chip internal memory forming an integral part of the signal processing subsystem 220 as opposed to the main or external memory 216 which may form part of a host computer system (e.g., the computer system 100). The circuit or subsystem memory 233 defines a cache memory portion 232 and a delay line memory portion 235, as described in more detail below. In one specific embodiment, the signal processing system 200 is an audio processing system for processing digital audio signals. In this embodiment, a plurality of signal processing modules 230 may be provided. Examples of signal processing modules 230 include a signal mixer, a sample rate converter, filters, and supporting circuitry for a CD input, a line input, a MIC input, and a speaker output. An exemplary embodiment of such a system including a plurality of signal processing modules or circuits is described below with reference to FIG. 6.

The cache memory portion 232 provides a buffer between the main memory 216 and the signal processor module 230. The main memory 216 may store the data samples to be operated on by the signal processor module 230. However, since the bus 212 in one embodiment may typically operate in a burst mode and have a high latency, the data samples may be transferred, one block at a time, between the main memory 216 and the cache memory portion 232. The data samples in the cache memory portion 232 may then be more conveniently accessed by the signal processor module 230. The cache memory portion 232 may be implemented with sufficient size to provide the required functionality, as further described below.

Audio systems for processing digital signals are well known in the art. An example of caching at a circuit level is described in U.S. Pat. No. 5,342,990 entitled "DIGITAL SAMPLING INSTRUMENT EMPLOYING CACHE MEMORY," assigned to the assignee of the present invention, and incorporated herein by reference.

Figure 3:
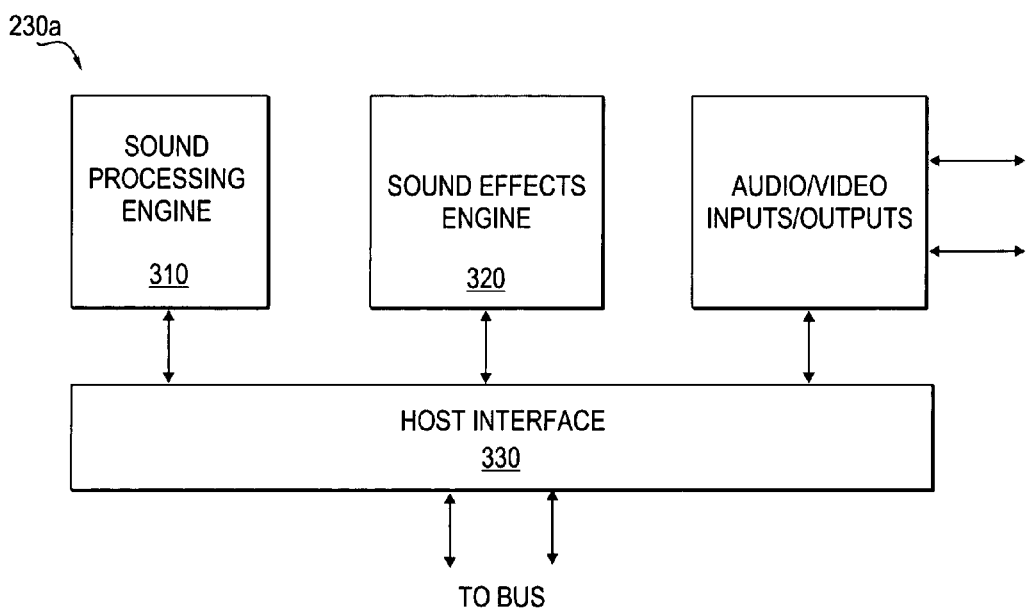
FIG. 3 shows a simplified block diagram of a signal processor used for audio processing.

FIG. 3 shows a simplified block diagram of an exemplary signal processor module 230a used for audio processing. The signal processor module 230a may, for example, implement the signal processor module 230 in FIG. 2. The signal processor module 230a may include three primary functional units: a sound processing engine 310, a sound effects engine 320, and a host interface unit 330. The sound processing engine 310 can include, for example, a 64-voice wavetable synthesizer and 16 summing effects buses. Each of the 64 voice channels can be routed, at its respective programmable amplitude, to an arbitrary selection of four of these buses.

The sound effects engine 320 may receive input from the sound processing engine 310 and from additional audio inputs (not shown) such as CD Audio, I$^2$S, a microphone jack, a stereo input and an auxiliary S/PDIF input, among others. The sound effects engine 320 may include functional units to execute signal processing instructions from a digital signal processing (DSP) program. The host interface unit 330 may interface the sound effects engine 320 with a host processor (e.g., the central processor 114 in FIG. 1) using, for example, a PCI protocol. Although not shown in FIG. 3, the signal processor module 230a can also include a memory element for storing, for example, source code that directs the operation of the functional units within the signal processor module 230a. A configuration wherein various signal processing modules of the exemplary processor module 230a are arranged in a ring configuration is described in U.S. patent application Ser. No. 10/636,087 filed Aug. 6, 2003, assigned to the assignee of the present invention, and incorporated herein by reference. Details of another configuration of exemplary functional units of the signal processor module 230a are also set forth in U.S. Pat. No. 5,928,342, entitled "AUDIO EFFECTS PROCESSOR INTEGRATED ON A SINGLE CHIP WITH A MULTI-PORT MEMORY ONTO WHICH MULTIPLE ASYNCHRONOUS DIGITAL SOUND SAMPLES CAN BE CONCURRENTLY LOADED," assigned to the assignee of the present invention, and incorporated herein by reference.

Figure 4:
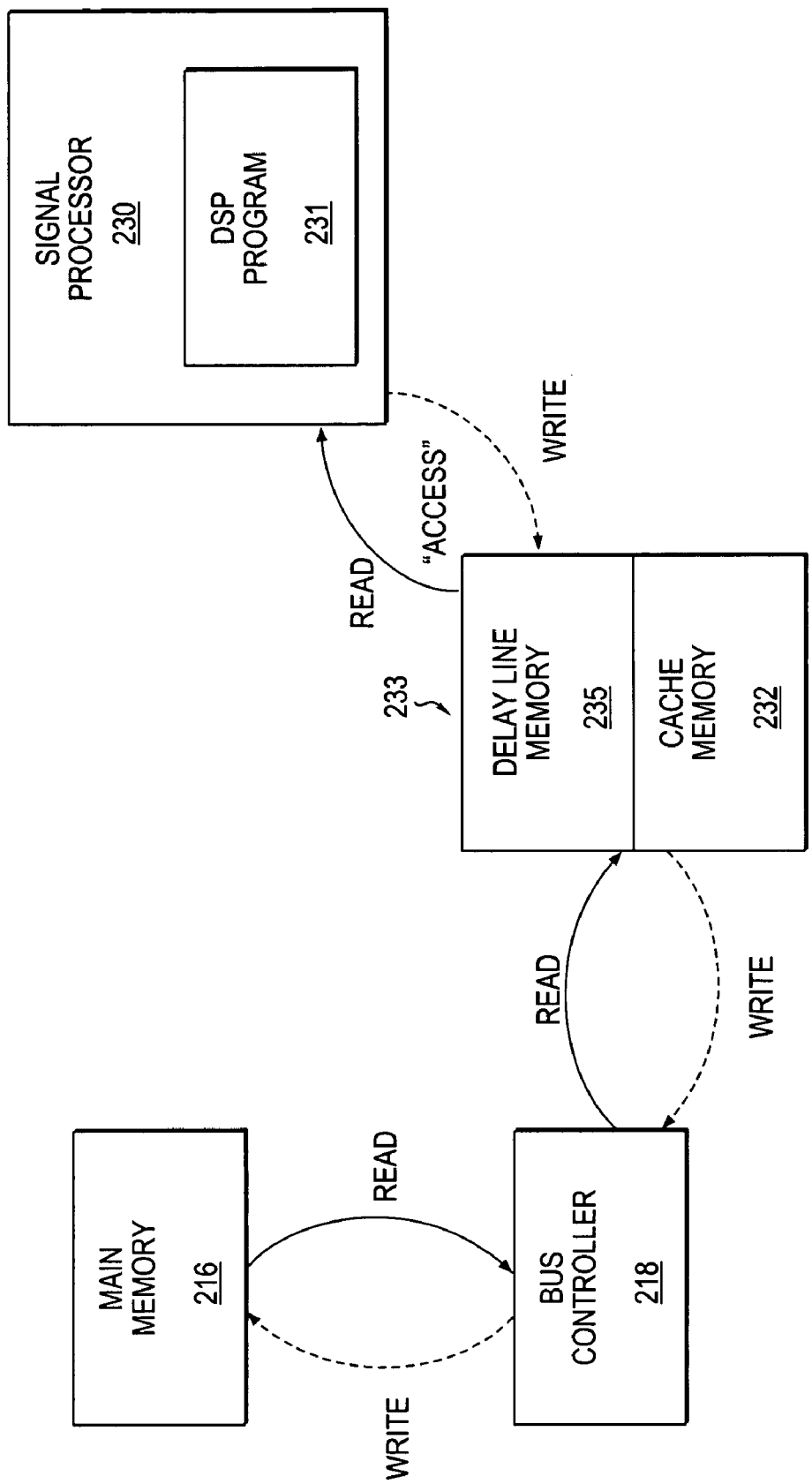
FIG. 4 shows the interaction, in accordance with the invention, between the signal processor, the main memory, and the cache memory.

FIG. 4 shows exemplary interaction, in accordance with the invention, between the signal processor module 230, the main or external memory 216, and the circuit memory 233. The signal processor module 230 may execute the DSP program 231 that implements algorithms that produce the desired effects. For example, for audio processing, the DSP program 231 can generate echo effects, reverberation effects, distortion effects, 3-D audio, environmental modeling, and others. The DSP program 231 may operate on data samples that (originally) reside within the main memory 216. The DSP program 231 may also provide data samples to be stored to the main memory 216. However, in certain embodiments, because of the high latency and burst characteristics of the data transfer to and from main memory 216, the data samples are temporarily stored in the intermediate cache memory portion 232. For a read access of a data sample by the DSP program 231, the data sample may be retrieved from the cache memory portion 232. The contents of the cache memory portion 232 may be replenished (e.g., periodically) by performing a read operation from the main memory 216. Similarly, for a write access of a data sample by the DSP program 231, the data sample may be stored to the cache memory portion 232, and the contents of the cache memory portion 232 is transferred (e.g., periodically) to the main memory 216 by performing a write operation. For clarity, as used herein, read and write "accesses" include the data transfer between the signal processor module 230 and the circuit memory 233 (including the cache memory portion 232 and the delay line memory portion 235), and read and write "operations" include the data transfer between the cache memory portion 232 and the main memory 216.

The cache memory portion 232 may thus provide an interface between the main memory 216 and the signal processor module 230. The cache memory portion 232 may bridge the gap between the high-latency, block data transfer characteristics (e.g., of a typical computer system) and the low-latency, single data sample access requirements of the DSP program 231. Further, in circumstances when implementing digital delay lines, delays in updating the cache memory portion 232 that may render it unsuitable for use by the processing module 230, may be avoided by reading and writing directly to the delay line memory portion 233.

In one embodiment, to efficiently utilize the bus 212 (e.g., with its relatively high latency), the read and write operations may be "vectorized" such that a block of B data samples are read from, or written to the main memory 216 in a single transaction. Data samples required by the signal processor module 230 may be "pre-fetched," a block at a time, from the main memory 216 and temporarily stored in the cache memory portion 232. Similarly, data samples generated by the signal processor module 230 may be stored to the cache memory portion 232 and subsequently "post-written," a block at a time, to the main memory 216. The cache memory portion 232 may thus provide relatively low-latency access to data samples, on-demand as they are need by the DSP program, and on individual samples.

In some embodiments of the invention, the "pre-fetch" may be possible because the data "usage" is deterministic, and it is possible to know a priori which data samples will be needed in the future. In some other embodiments, the data samples needed in the future can be predicted or estimated. Thus, the data accesses by the processor may be effectively "anticipated." An exemplary method and circuit for implementing some embodiments of the present invention is described in U.S. Pat. No. 6,275,899, entitled "METHOD AND CIRCUIT FOR IMPLEMENTING DIGITAL DELAY LINES USING DELAY CACHES," filed Nov. 13, 1998, and assigned to the assignee of the present invention, is incorporated herein by reference. The implementation of delay lines as circular buffers is described in U.S. patent application Ser. No. 08/887,362. A method and circuit that initialize a memory, such as delay lines within main memory 216, and indicate when valid data is available from the memory are described in U.S. Pat. No. 6,032,325, entitled "MEMORY INITIALIZATION CIRCUIT," filed Nov. 14, 1998, and assigned to the assignee of the present invention, is incorporated herein by reference.

Figure 5:
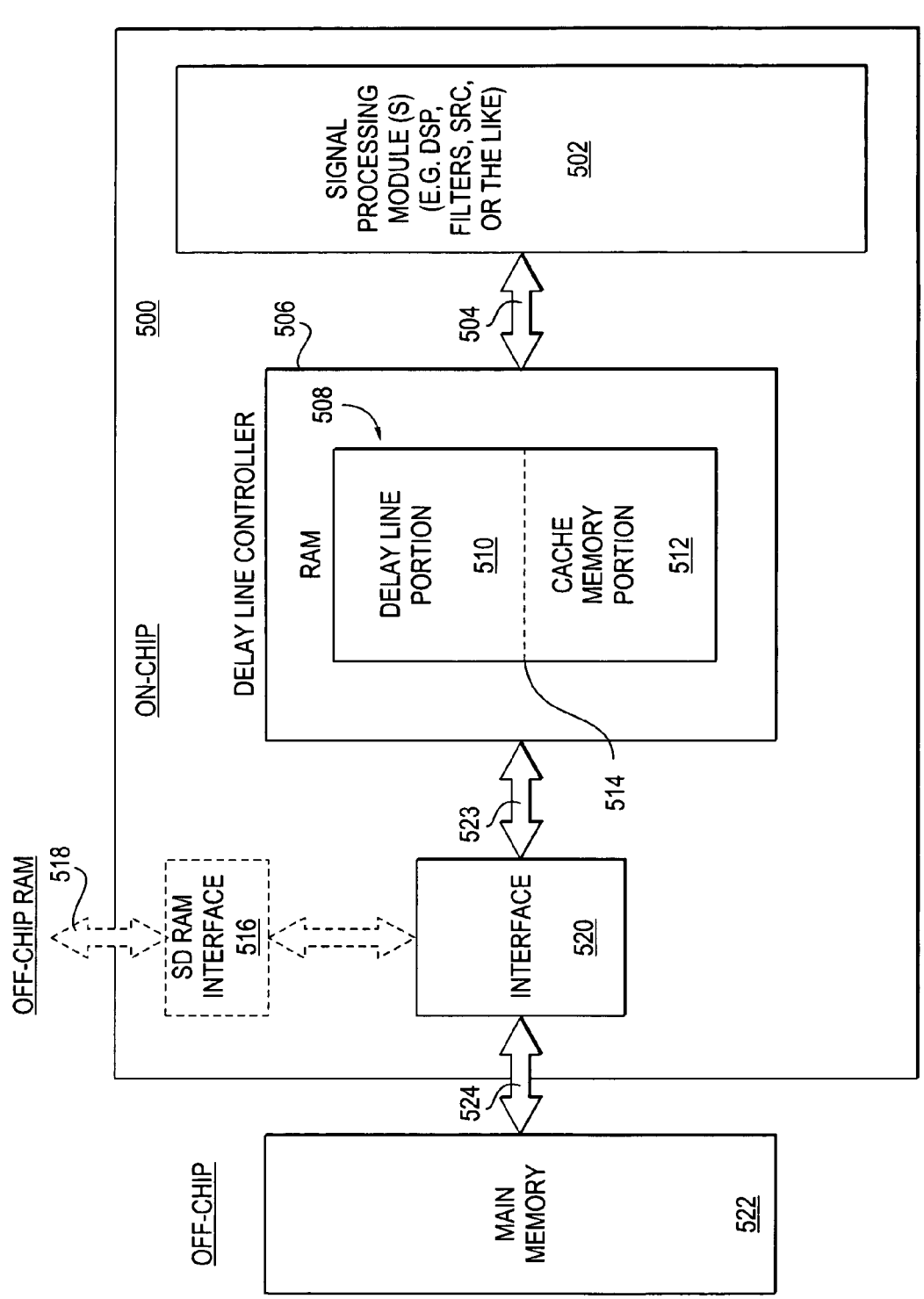
FIG. 5 shows a schematic block diagram of a circuit, in accordance with the invention, for implementing digital delay lines within external or main memory and on-chip memory.

Referring to FIG. 5 of the drawings, reference numeral 500 generally indicates a further embodiment of a digital signal processing subsystem, in accordance with the invention. The subsystem 500 may resemble the signal processing subsystem 220 and, in one embodiment, may form part of (or be fully implemented by) an integrated circuit or chip. The subsystem 500 includes at least one digital signal processor module 502 connected via a bus 504 to a delay line controller 506. As described in more detail below, the signal processor module 502 may communicate data samples to the delay controller 506 which, using both internal and external delay lines, delays the digital samples. In one embodiment, the delay line controller 506 includes on-chip or local memory such as circuit memory 508 that has a delay line memory portion 510 and a cache memory portion 512. The circuit memory 508 may be, for example, a 64 kilobyte RAM circuit provided on a silicon wafer on which the subsystem 500 is defined. It will, however, be appreciated that the circuit memory 508 need not necessarily form part of the delay line controller 506 but may be formed anywhere locally on the subsystem 500.

As described in more detail below, the sizes (e.g., the relative sizes) of the delay line memory portion 510 and the cache memory portion 512 may be adjusted as generally indicated by a boundary pointer 514. Thus, in use, an amount of memory that the delay line memory portion 510 uses of the available memory provided by the circuit memory 508 may vary and, accordingly, an amount of memory of the circuit memory 508 used by the cache memory portion 512 may also vary. In one embodiment, all memory of the circuit memory 508 is allocated between the delay line memory portion 510 and the cache memory portion 512.

In certain embodiments, the subsystem 500 may optionally include an SDRAM interface 516 for interfacing off-chip RAM to the subsystem 500 via a bus 518. It will, however, be appreciated that the circuit memory 508 (and any off-chip memory) need not be limited to RAM or random access memory but may be any type of memory for storing digital data.

The subsystem 500 also includes an interface 520 connected to the delay line controller 506 via a bus 523. The interface 520 is also connectable to external or main memory 522 that is off-chip, or to the off-chip RAM via the bus 518. The main memory 522 may correspond to the main memory 216 (see FIG. 2) and, accordingly, a communication bus 524 that connects the main memory 522 and the interface 520 may correspond to the bus 212 (see FIG. 2). In a similar fashion, the circuit memory 508 may correspond to the circuit memory 233 of FIG. 2.

In the exemplary configuration of the subsystem 500 shown in FIG. 5, the signal processor module 502 may be one of a plurality of signal processing modules for processing digital audio signals. For example, the digital signal processor module 502 may include a sample rate converter module, a filter module, a digital signal processing (DSP) module, or any other module required to process digital audio signals. It is, however, to be appreciated that the invention applies equally to the digital processing of other signals such as video signals. In these circumstances, the digital signal processor module 502 may then be a video signal processing module. In one embodiment, the filter module, sample rate converter module, and the like may be connected to a DSP which then communicates or implements any delays required by any one or more of the modules including delays of digital signals required by the DSP. As described above, the host system (e.g., the computer system 100) to which the subsystem 500 is connected may include a DSP program (e.g., a DSP program 231) for executing various algorithms to process the digital signals (e.g., audio and/or video signals).

Figure 6:
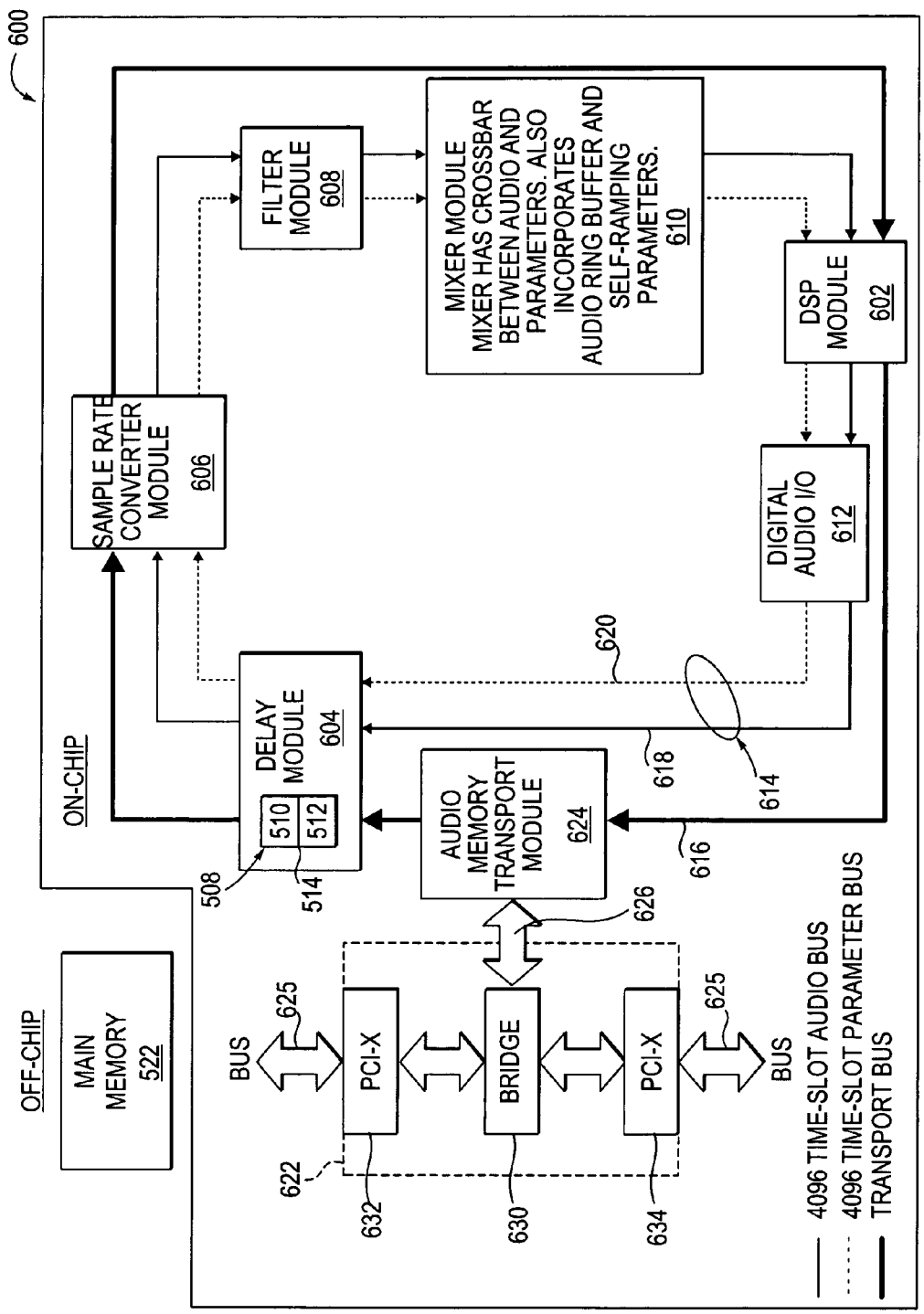
FIG. 6 shows a schematic block diagram of a circuit, in accordance with the invention, for implementing digital delay lines used by various signal processing modules arranged in a ring configuration.

Referring to FIG. 6, reference numeral 600 generally indicates a further exemplary embodiment of a digital signal processing subsystem, in accordance with the invention. The subsystem 600 may be in the form of a digital processing circuit including a plurality of digital signal processing modules arranged in a ring fashion. For example, the subsystem 600 may include a DSP module 602, a delay module 604 including a delay line controller, a sample rate converter module 606, a filter module 608 and a mixer module 610. Further, the subsystem 600 may include a digital audio input/output (I/O) module 612. The various modules 602 to 612 are interconnected by a data bus 614 and a transport bus 616. The data bus 614 includes, as described in more detail below, an audio bus 618 and a parameter bus 620. It is, however, to be appreciated that the invention is not limited to a configuration of modules that are arranged in a ring but applies in any situation where one or more signal processor modules communicate directly or indirectly with circuitry or components implementing delay lines (e.g., as shown in FIG. 5).

In one embodiment, the subsystem 600 also includes a transport control or bus interface 622 connected via the transport bus 616 to an audio memory transport module 624. The audio memory transport module 624 is connected via the transport bus 616 to the delay module 604, the sample rate converter module 606, and the DSP module 602. Accordingly, any one of the exemplary modules 602, 604, and 606 may communicate data to a host system via the transport control interface 622. The transport control interface 622 may be integrally formed on-chip with the other modules of the system 600.

As described in more detail below, the delay module 604 allows any one of the modules 606, 608, 610, 602, and 612 to communicate digital data samples to the delay module 604 that are to be delayed. Typically, the modules 606, 608, 610, 602, and 612 communicate digital data samples representative of, for example, audio data that is to be delayed using the delay module 604. As described above and in more detail below, the delay module 604 may then implement delay lines directly within its circuit memory 508 (e.g., its delay line memory portion 510) and/or in the main memory 522 via the cache memory portion 512.

Figure 7:
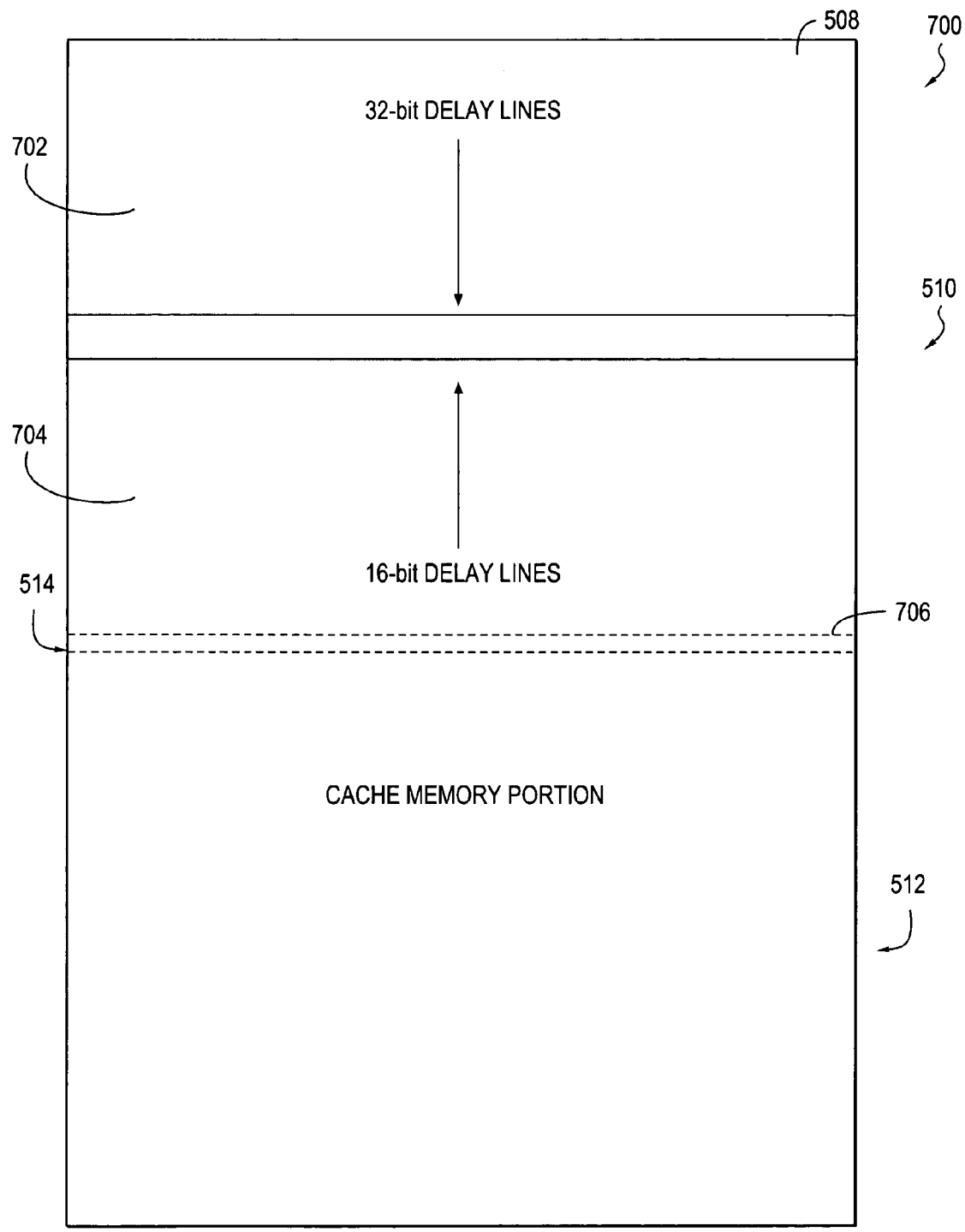
FIG. 7 shows a schematic representation of internal memory apportioned between delay line cache memory and delay line memory.

Referring to FIG. 7, reference numeral 700 generally indicates a schematic view of exemplary apportioning of at least part of the memory of the circuit memory 508. As mentioned above, the boundary pointer 514 may be used to indicate a division or boundary between the delay line memory portion 510 and an external tank or primary cache portion 512. In one embodiment, the position of the boundary pointer 514 within the circuit memory 508 may be predetermined and identified in the exemplary DSP program 231. However, it is to be appreciated that the boundary pointer 514 may, in other embodiments, be variable and depend on various different factors including the number of delay lines implemented by the delay line memory portion 510 as opposed to the number of delay lines implemented via the cache memory portion 512. Accordingly, the boundary pointer 514 may define the relative sizes between the delay line memory portion 510 and the cache memory portion 512 of the circuit memory 508. In one embodiment, the circuit memory 508 includes a total of 64 kilobytes of memory apportioned, for example, so that 75% (48 kilobytes) is allocated to the delay line memory portion 510 and 25% (16 kilobytes) is allocated to the primary cache memory portion 512. In one embodiment of the invention, the delay line memory portion 510 includes two memory sub-portions 702 and 704 each of which may be arranged in a circular buffer configuration. For example, the memory sub-portion 702 may be used to implement 32-bit delay lines and the memory sub-portion 704 may be used to implement 16-bit delay lines. However, the cache memory portion 512 may be arranged to accommodate both 32-bit and 16-bit delay lines with corresponding addresses in the main memory 522 being divided into 16-bit and 32-bit portions.

Figure 8:
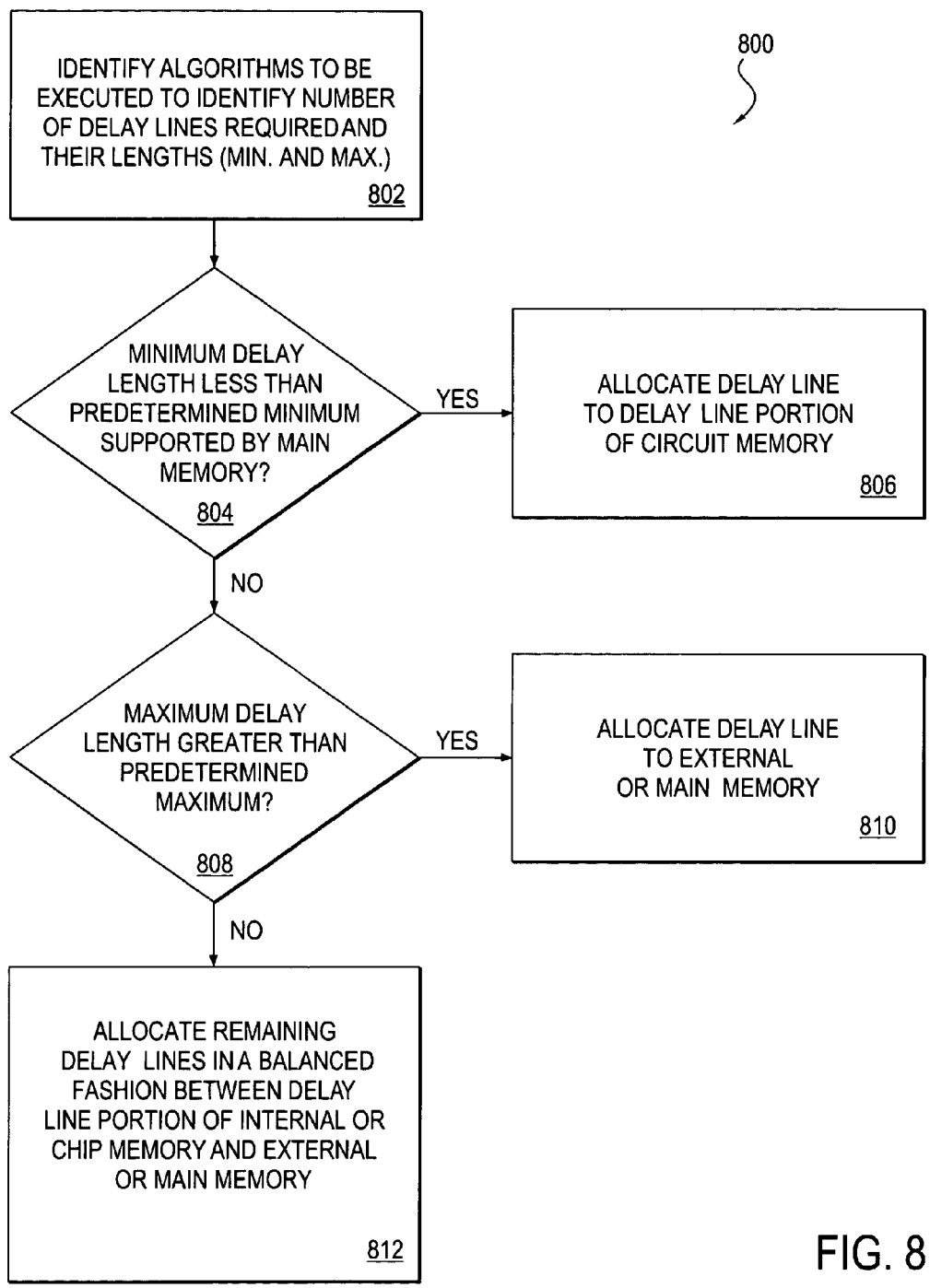
FIG. 8 shows an exemplary flow diagram of a method, in accordance with the invention, for allocating delay lines between main memory and local on-chip memory.

Referring in particular to FIG. 8, reference numeral 800 generally indicates a method, in accordance with the invention, to assist in apportioning the sizes of the delay line memory portion 510 and the cache memory portion 512. Initially, as shown at operation 802, the method 800 may identify algorithms to be executed so as to identify a number and length of delay lines to be implemented. In one embodiment, a maximum and a minimum length (e.g., number of memory locations to implement the delay) of each delay line to be implemented is determined. It will be appreciated that number of delay lines and/or their respective lengths may be provided in the DSP program 131.

Once the number and lengths of the delay lines have been determined, delay lines with a minimum delay length less than (or less than or equal to) a predetermined minimum delay length supported by the main memory 522 (via its associated cache memory portion 524) may be identified (see decision operation 804) and allocated to the delay line memory portion 510 (see operation 806). The actual delay lines are then implemented in the delay line memory portion 510 and are not merely pointers that may point to cache data from another memory device that actually implements the delay lines. These delay lines may be allocated to the delay line memory portion 510 of the internal or circuit memory 508, as described above, as post-writing and pre-fetching of data samples from the main memory 522 to the cache memory portion 512 require a finite amount of time which may exceed the delay that is required to be effected by the delay line. However, the signal processor module 502 (see FIG. 5) and the modules 602, 604, 606, 608, 610, 612 (see FIG. 6) may directly access the delay line memory portion 510 thereby allowing relatively short delays to be implemented.

Returning to decision operation 804, if the minimum delay length required is not less than the predetermined minimum supported by the main memory 522 via the cache memory portion 512, then, as shown at decision operation 808, a determination is made as to whether or not the maximum delay of each delay line is greater than (or greater than or equal to) a predetermined maximum delay. If so, then as shown at operation 810 the delay line may be allocated to the external or main memory 522 and, accordingly, provision is then made in the cache memory portion 512 to accommodate the external delay line. For example, a read and write location corresponding to a start and an end of the delay line may be provided in the cache memory portion 512. These delay lines may be allocated to the external memory 522 as, due to their length, they may occupy an excessive amount of memory if implemented in the delay line memory portion 510.

Returning to decision operation 808, if the maximum delay length required by a particular delay line is not greater than (or greater than or equal to) the predetermined maximum, then various different user defined rules may be utilized to allocate the delay line either to the delay line memory portion 510 or the main memory 522 via the cache memory portion 512 (see operation 812). It will be appreciated that the DSP program 231, or any other program code, may be used to balance the number of delay lines provided on-chip in the delay line memory portion 510 against the number of delay lines provided off-chip in the external or main memory 522 via the delay line cache memory portion 512.

Further to the discussion above regarding the read and write operations executed to communicate data between the main memory 522 and the memory cache portion 512, in one embodiment the amount of cache memory needed (and thus amount of memory provided by the cache memory portion 512) need only be dependent upon the number of delay lines provided by the external or main memory 522 as only a read and a write location may be required in the cache memory portion 512. However, the amount of memory required by the delay line memory portion 510 would be dependent on both the number of delay lines implemented as well as the required length of the delay lines as the actual delay of the data sample is carried out in the delay line memory portion 510, and thus in circuit memory 508.

For example, assume that 75% of the available memory of the circuit memory 508 is allocated to the delay line memory portion 510 and 25% is allocated to the cache memory portion 512 and the total number of delay line pointers is 1024. In these circumstances 256 delay line caches may be provided in the cache memory portion 512 and, accordingly, 768 pointers may be available for implementing delay lines in the delay line memory portion 510. Assuming by way of example that a total of 64 kilobytes of memory is available, the 768 pointers may then correspond to 48 kilobytes of internal memory and the 256 caches would then correspond to 16 kilobytes of memory.

As mentioned above, the delay memory portion 510 may include a 32-bit memory sub-portion 702 for implementing 32-bit delay lines, and a 16-bit memory sub-portion 704 for implementing 16-bit delay lines. In one embodiment of the invention, the 32-bit memory sub-portion 702 and the 16-bit memory sub-portion 704 are configured as circular buffers. The circuit memory 508 may have a 16-bit partition base register that indicates a start of the 16-bit memory sub-portion 704 within the available memory of the circuit memory 508, as generally indicated by a boundary pointer 706 (see FIG. 7). It will be appreciated that the boundary pointer 706 may correspond to the boundary pointer 514. Further, a 16-bit buffer size register may indicate the number of pages or buffers that are allocated to the particular 16-bit memory sub-portion 704. Thus, an indication is provided of the starting point of the 16-bit memory sub-portion 704 within the circuit memory 508 as well as the total amount of memory allocated to the 16-bit memory sub-portion 704. Further, a 32-bit buffer size register may be provided that indicates the number of bytes (or 64-byte cache lines) that are allocated to the 32-bit memory sub-portion 702. In one embodiment, addressing of the memory locations of the 32-bit memory sub-portion 702 and the 16-bit memory sub-portion 704 are arranged so that software implemented, for example, by the DSP program 231 can write the base addresses directly without any conversion. In one embodiment, a 32-bit partition base register may be provided to indicate a start of a 32-bit memory sub-portion within the main memory 522. For example, the 32-bit partition base register may include a starting address of a sub-portion pointer that, for example, indicates the start of a four kilobyte page of the 32-bit memory sub-portion in the main memory 522. Further, a 32-bit buffer size register may be provided that indicates the number of bytes (or 4 kilobyte pages) that are allocated to the 32-bit memory sub-portion within the main memory 522. In one embodiment, a 16-bit partition base register may be provided to indicate a start of a 16-bit memory sub-portion within the main memory 522. For example, the 16-bit partition base register may include a starting address of a sub-portion pointer that, for example, indicates the start of a four kilobyte page of the 16-bit memory sub-portion in the main memory 522. Further, a 16-bit buffer size register may be provided that indicates the number of bytes (or 4 kilobyte pages) that are allocated to the 16-bit memory bus-portion within the main memory 522.

In one embodiment of the invention, as described above, the relative sizes of the delay line memory portion 510 and the cache memory portion 512 are apportioned based on algorithms to be executed by the digital signal processing subsystem 600. In one embodiment, the circuit memory 508 has a capacity of 64 kilobytes that may define a 1024-channel primary cache. Software of the DSP program 231 may then define the boundary pointer 514 (e.g. in a start channel register), the size of the 16-bit memory sub-portion 704, and/or the size of the 32-bit memory sub-portion 702. Accordingly, the combined memory allocated to the 32-bit memory sub-portion 702 and the 16-bit memory sub-portion 704 may thus not exceed the total memory available in the memory circuit 506 minus the boundary pointer 514 multiplied by 64 bytes.

In one embodiment, when all the available memory of the circuit memory 508 is allocated to cache memory for caching digital data from the main or external memory 522, then both the 32-bit buffer size register and the 16-bit buffer size registers may hold values of zero. However, when memory is apportioned to both the delay line memory portion 510 and the cache memory portion 512, then the 32-bit buffer size register and/or the 16-bit buffer size register may be non-zero.

Opcodes may be used to identify whether a 32-bit delay line or a 16-bit delay line is required for a particular digital sample. Thus, the opcodes may be used to identify whether data is to be stored in the 32-bit delay line memory sub-portion 702 or in the 16-bit delay line memory sub-portion 704. In one embodiment of the invention, the circuit memory 508 is allocated between the 16-bit memory sub-portion 704 and the 32-bit memory sub-portion 702 in such a fashion so that a 16-bit buffer starts at an address of the circuit memory 508 defined by the boundary point of 514 and progresses upwardly to memory locations identified in the 16-bit buffer size register. The 32-bit buffer portion provided in the memory sub-portion 702 then starts at an uppermost address within the circuit memory 508 and grows downwardly (decreasing address) to lower addresses identified in the 32-bit buffer size register.

Figure 9:
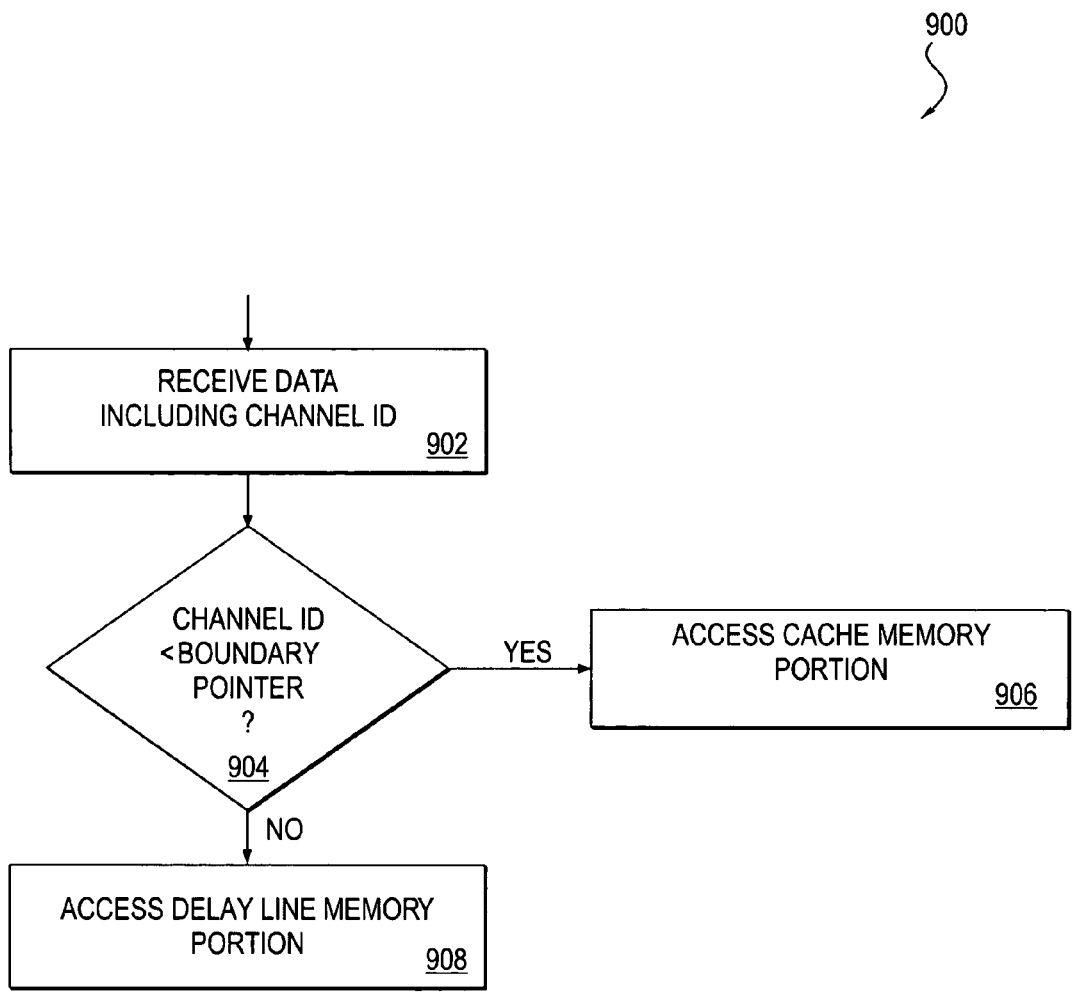
FIG. 9 shows an exemplary flow diagram of a method, in accordance with the invention, for writing a data sample to a digital delay line.

Referring in particular to FIG. 9, reference numeral 900 generally indicates a method, in accordance with the invention, to write digital data samples to the circuit memory 508. In this exemplary embodiment, data is included in channels provided on the audio bus 618. Initially, as shown at operation 902, a delay line controller operating with the circuit memory 508 receives digital data samples including a channel identifier (ID). Thereafter, as shown at decision operation 904, the value of the channel identifier is compared to the value of the boundary pointer 514 and, if the value of the channel identifier is less than the boundary pointer 514, then the cache memory portion 512 is accessed (see operation 906). In particular, the data sample is then written to a memory location in the cache memory portion 512 that is identified by the channel identifier. Accordingly, in one embodiment, the channel identifier may be used to identify specific memory locations corresponding to delay lines in both the delay line memory portion 510 and the cache memory portion 512. Further, the channel identifier may be used to identify whether the delay line is a 16-bit or 32-bit delay line.

Returning to decision operation 904, if the channel identifier is greater than or equal to the boundary pointer 514 then, as shown at operation 908, the delay line memory portion 510 is accessed. In one embodiment, the channel identifier may be used to read an opcode to distinguish between 16-bit and 32-bit data and, dependent upon the opcode, an appropriate sub-portion may be accessed.

Figure 10:
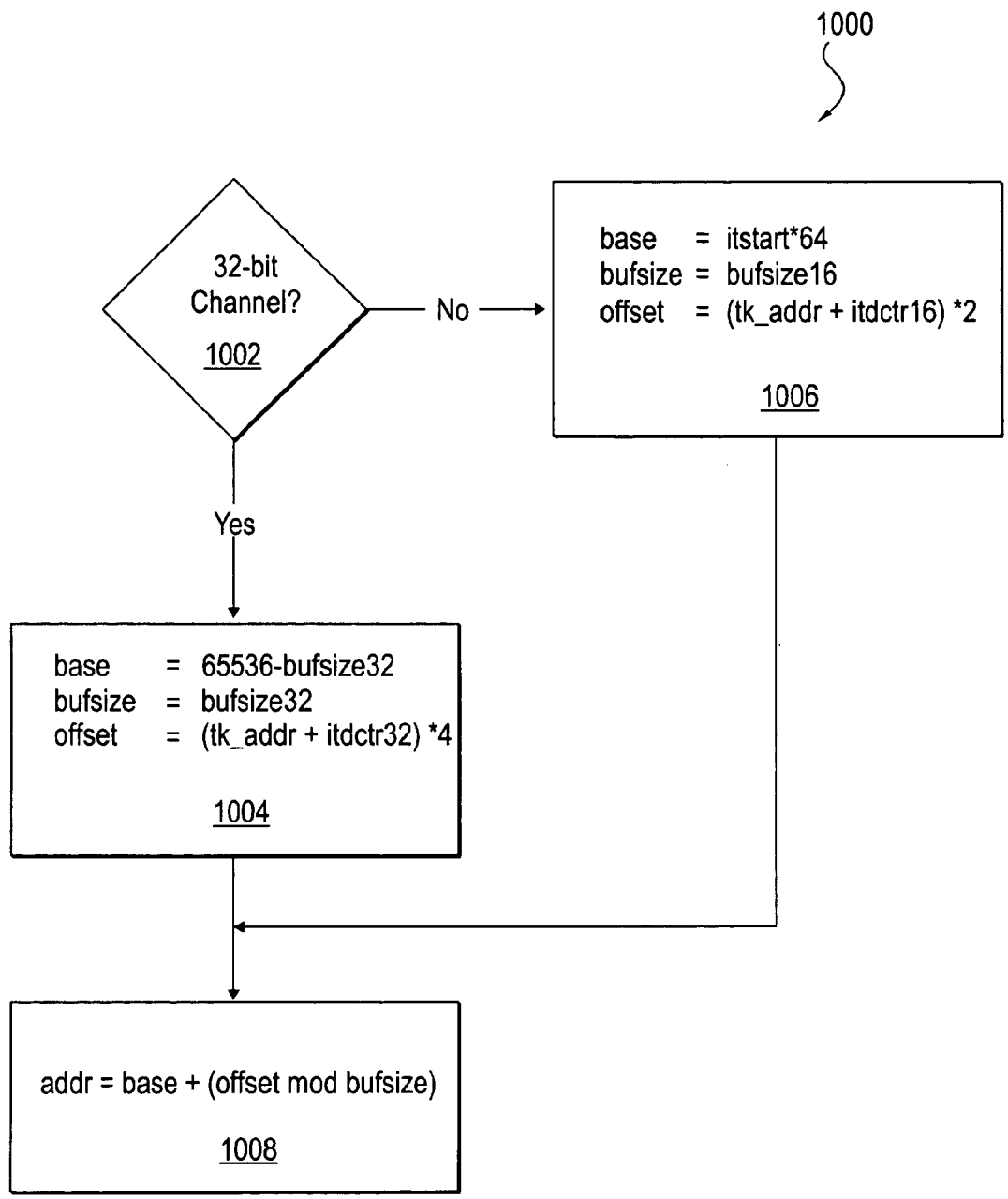
FIG. 10 shows an exemplary flow diagram of a method, in accordance with the invention, for selecting two exemplary subsections of the internal memory.

Referring to FIG. 10, reference numeral 1000 generally indicates a further exemplary method, in accordance with the invention, for writing digital samples for delay in the circuit memory 508. As shown at decision operation 1002, a determination is first made whether or not the digital data included in the channel is 32-bit data. If the data is 32-bit data, then the digital sample data is written to a memory location in the corresponding 32-bit sub-portion of the delay line portion 510 or cache memory portion 512, as the case may be. If the data is 16-bit data, then the digital sample data is written to a memory location in the corresponding 16-bit sub-portion of the delay line portion 510 or cache memory portion 512, as the case may be. As mentioned above, the channel identifier may be used to identify if the data is 16-bit data or 32-bit data. As shown at operation 1004, for an exemplary 64 kilobyte circuit memory, a corresponding offset, base and buffer size for 32-bit data may be determined. Likewise, as shown at operation 1006, a corresponding offset, base and buffer size may be determined for 16-bit data. Thereafter, at operation 108 an address in the circuit memory 508 is calculated and the data is stored.

Although the subsystem 600 is shown to process digital audio signals, it will be appreciated that the subsystem 600 may be used to process any digital signals including video and other multi-media signals. Unlike conventional digital processing devices, the subsystem 600 in accordance to the invention allows each module 602 to 612 to communicate data with any other module 602 to 612 connected to the data path 614. In one embodiment of the invention, the data path 614 is time division multiplexed wherein a routing controller controls communication of data between the various modules 602 to 612. Further, it is to be appreciated, that the modules 602 to 612 are merely exemplary modules and further modules (with the same or differing processing capabilities) may be included in the subsystem 600 and/or any one or more of the modules 602 to 612 may be removed and, for example, included within any other module 602 to 612.

Thus, in one embodiment, any one of the modules 602, 606 to 612 may communicate data to the delay modules 604. Accordingly, data being processed by the digital processing subsystem 600 may be flexibly routed to the delay module 604. It will be appreciated that a module 602 to 612 may also communicate data back to itself via the audio bus 618. Accordingly, repeated processing may be performed on the data by the same processing module.

The audio memory transport module 624 communicates via a bus 626 with the interface module 622 that, for example, communicates with a bus 625 of the host computer device (for example a personal computer or PC). In one embodiment, the interface module 622 includes a bridge 630 and two PCI-X bus interfaces 632 that interface the bridge 630 to the conventional PC bus 625 (which may correspond to the bus 112 of FIG. 1). The digital I/O module 612 may receive a digital audio input and provide digital audio output to an output device. As the various modules are located along the audio bus 618, audio data may be routed between modules without requiring the data to be routed through a central hub (e.g., a DSP).

In one embodiment, each delay line of the delay line memory portion may be accessed with individual read and write operations that are separate from those of other delay lines. Accordingly, the memory circuit or local memory 508 may be directly coupled to a digital signal processor that executes the DSP algorithm. The direct coupling of these circuit elements allows the processor to access the local memory with low latency, on-demand (e.g., as needed by the processor), and on a sample-by-sample basis. However, as the requirement for local or circuit memory increases in size, it may become less cost effective to use local memory to implement all the delay lines. Accordingly, delay lines can also be allocated to the main memory via the delay line cache. In one embodiment, for improved efficiency, a bus may transfer a block of data at a time (e.g., in a "burst mode") between the cache memory portion and the main memory.

Thus, a method, circuit and system to process digital delays have been described. Although, the invention is described with reference to processing a digital media stream in the form of a digital audio stream, it is however to be appreciated that the invention may be applied to the processing of any other digital media streams, for example, digital video streams or the like. Further, although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A digital processor circuit comprising:
   circuit memory comprising:
      a digital delay line memory portion to provide a plurality of digital delay lines; and
      a cache memory portion operatively coupled to main memory, the cache memory portion comprising a plurality of delay caches that are updated during a pre-fetch operation with data samples from corresponding delay lines in the main memory; and
   a processor module coupled to the circuit memory, wherein the processor module has access to pre-fetched data samples from each delay cache in the cache memory portion and access to data samples in the delay lines of the delay line memory portion.

2. The circuit of claim 1, wherein the sizes of the delay line memory portion and the cache memory portion of the circuit memory are adjustable.

3. The circuit of claim 2, wherein the relative sizes of the delay line memory portion and the cache memory portion is dependent upon algorithms operatively executed by, the processor module.

4. The circuit of claim 1, wherein delay lines required by the processor module that exceed a predetermined maximum length are allocated to the main memory.

5. The circuit of claim 1, wherein delay lines required by the processor module that are less than a predetermined minimum length are allocated to the digital delay line memory portion of the circuit memory.

6. The circuit of claim 1, wherein delay lines required by the processor module that exceed a predetermined maximum length are allocated to the main memory, delay lines required by the processor module that are less than a predetermined minimum length are allocated to the digital delay line memory portion of the circuit memory, and delay lines with a length required between the predetermined maximum and the predetermined minimum are allocated based on the sizes of the delay line memory portion and the cache memory portion.

7. The circuit of claim 1, wherein the data samples are digital representations of audio signals and the processor module is selected from one of a digital signal processor, a delay line module, a filter module, a mixer module and a sample rate converter module.

8. The circuit of claim 1, wherein a post-write data transfer operation transfers data samples from the cache memory portion to the main memory.

9. The circuit of claim 1, wherein at least one of the digital delay line memory portion and the cache memory portion is apportioned into at least two memory sub-portions for data samples of different sample lengths.

10. The circuit of claim 9, wherein there are at least two sub-portions for sample lengths of 16-bits and 32-bits.

11. The circuit of claim 1, wherein at least two delay lines in the main memory share a single read pointer, where the single read pointer is associated with a single read delay cache.

12. The circuit of claim 1, wherein two delay caches in the cache memory portion are associated with a delay line in the main memory.

13. The circuit of claim 12, wherein the two delay caches include a read delay cache and a write delay cache.

14. The circuit of claim 1, which includes a bus interface connectable via a bus to the main memory to allow communication between the circuit memory and the main memory.

15. The circuit of claim 14, wherein the sizes of the digital delay line memory portion and the cache memory portion are dependent, in part, upon the data transfer size and a latency of the bus.

16. The circuit of claim 1, wherein data samples are communicated in a plurality of channels wherein each channel is assigned to a delay line provided by one of the cache memory portion and the delay line memory portion of the circuit memory.

17. An audio signal processor integrated circuit, which comprises:
  circuit memory comprising:
    a digital delay line memory portion to provide a plurality of digital delay lines for delaying data samples of audio signals; and
    a cache memory portion operatively coupled to external main memory, the cache memory portion comprising a plurality of delay caches that are updated with data samples from corresponding delay lines in the main memory; and
  a digital signal processor coupled to the circuit memory, wherein the digital signal processor has access to individual pre-fetched data samples from the delay cache in the cache memory portion and access to data samples in the delay lines of the delay line memory portion.

18. The integrated circuit of claim 17, wherein the sizes of the delay line memory portion and the cache memory portion of the circuit memory are adjustable.

19. The integrated circuit of claim 18, wherein the sizes of the delay line memory portion and the cache memory portion are dependent upon algorithms operatively executed by the processor.

20. The integrated circuit of claim 19, wherein a post-write data transfer operation transfers data samples from the cache memory portion to the main memory.

21. An audio circuit board comprising a delay line circuit, the delay line circuit comprising:
  circuit board memory comprising:
    a digital delay line memory portion to provide a plurality of digital delay lines for delaying data samples of audio signals; and
    a cache memory portion operatively coupled to external main memory, the cache memory portion comprising a plurality of delay caches that are updated with data samples from corresponding delay lines in the main memory; and
  a digital signal processor coupled to the circuit board memory, wherein the digital signal processor has access to individual pre-fetched data samples from the delay cache in the cache memory portion and access to data samples in the delay lines of the delay line memory portion.

22. The circuit board of claim 21, wherein the sizes of the delay line memory portion and the cache memory portion of the circuit board memory are adjustable.

23. A computer system comprising a delay line circuit, the delay line circuit comprising:
  a main memory comprising at least one digital delay line, each delay line having respective read and write pointers;
  a digital audio processing circuit, which comprises:
    circuit memory comprising:
      a digital delay line memory portion to provide a plurality of digital delay lines; and
      a cache memory portion operatively coupled to the main memory, the cache memory portion comprising a plurality of delay caches that are updated with data samples from corresponding delay lines in the main memory; and
    a digital signal processor coupled to the circuit memory, wherein the digital signal processor has access to pre-fetched data samples from each delay cache in the cache memory portion and access to data samples in the delay lines of the delay line memory portion.

24. The computer system of claim 23, wherein the main memory stores a Digital Signal Processor (DSP) program that defines the sizes of the delay line memory portion and the cache memory portion.

25. A method to process delays of digital data samples, the method comprising:
  storing the data samples in circuit memory, the circuit memory comprising:
    a digital delay line memory portion to provide a plurality of digital delay lines; and
    a cache memory portion to provide a plurality of delay caches, each delay cache corresponding to a delay line provided by main memory;
  post-writing data samples from the delay cache to the main memory and pre-fetching delayed digital data from the main memory to the cache memory portion; and
  reading delayed data samples from the circuit memory.

26. The method of claim 25, wherein the sizes of the digital delay line memory portion and the cache memory portion are adjustable.

27. The method of claim 25, wherein the sizes of the delay line memory portion and the cache memory portion are dependent upon algorithms operatively executed by the processor module.

28. The method of claim 25, which includes allocating delay lines that exceed a predetermined maximum length to the main memory.

29. The method of claim 25, which comprises allocating delay lines that are less than a predetermined minimum length to the digital delay line memory portion of the circuit memory.

30. The method of claim 25, which comprises:
   allocating delay lines that exceed a predetermined maximum length to the main memory;
   allocating delay lines that are less than a predetermined minimum length to the digital delay line memory portion of the circuit memory; and
   allocating delay lines with a length required between the predetermined maximum and the predetermined minimum based on the sizes of the delay line memory portion and the cache memory portion.

31. The method of claim 25, wherein the data samples are digital representations of audio signals received from one of a digital signal processor, a delay line module, a filter module, a mixer module, and a sample rate converter module.

32. The method of claim 25, wherein a post-write data transfer operation transfers data samples from the cache memory portion to the main memory.

33. The method of claim 25, which includes apportioning at least one of the digital delay line memory portion and the main memory into at least two memory sub-portions that implement delay lines for data samples of different sample lengths.

34. The method of claim 25, which comprises transferring data between the main memory and the circuit memory via a system bus.

35. The method of claim 25, which comprises communicating the data samples via a plurality of channels wherein each channel is assigned to a delay line associated with one of the cache memory portion and the delay line memory portion of the circuit memory.

36. A machine-readable medium embodying a sequence of instructions that, when executed by a machine, cause the machine to:
   store data samples in circuit memory, the circuit memory comprising:
      a digital delay line memory portion to provide a plurality of digital delay lines; and
      a cache memory portion to provide a plurality of delay caches, each delay cache corresponding to a delay line provided by main memory;
   post-write the data samples from the delay cache to the main memory and pre-fetch delayed digital data from the main memory to the cache memory portion; and
   read delayed data samples from the circuit memory.

37. The machine-readable medium of claim 36, wherein the sizes of the digital delay line memory portion and the cache memory portion are adjustable.

38. The machine-readable medium of claim 36, wherein the sizes of the delay line memory portion and the cache memory portion are dependent upon algorithms operatively executed by a processor module.

39. A digital signal processing circuit comprising:
   circuit memory means comprising:
      a digital delay line memory portion to provide a plurality of digital delay lines; and
      a cache memory portion operatively coupled to main memory, the cache memory portion comprising a plurality of delay caches that are updated with data samples from corresponding delay lines in the main memory; and
   processor means coupled to the circuit memory means, wherein the processor means has access to pre-fetched data samples from each delay cache in the cache memory portion and access to data samples in the delay lines of the delay line memory portion.

* * * * *